United States Patent [19]

O'Brian et al.

[11] 4,138,140

[45] Feb. 6, 1979

[54] FOLDING STRUCTURES USEFUL AS TWO-WHEELED CARTS

[76] Inventors: Edward D. O'Brian, 910 Iroquois, Anaheim, Calif. 92801; William M. Plachy, 3353 San Marcos Bl., San Marcos, Calif. 92069

[21] Appl. No.: 786,832

[22] Filed: Apr. 12, 1977

[51] Int. Cl.² .............................................. B62B 3/02
[52] U.S. Cl. .................................. 280/652; 280/47.26
[58] Field of Search .......... 280/652, 646, 47.24–47.26, 280/47.18, 651–654; 220/224 F, 6

[56] References Cited

U.S. PATENT DOCUMENTS

| | | | |
|---|---|---|---|
| 1,356,995 | 10/1920 | Mayer | 220/6 |
| 1,879,102 | 9/1932 | Collins | 220/6 X |
| 2,471,462 | 5/1949 | Toth | 280/653 |
| 2,688,493 | 9/1954 | Rosenberg | 280/651 |
| 2,727,751 | 12/1955 | Souris | 280/653 R |
| 3,032,230 | 5/1962 | Gerber | 220/6 |
| 3,854,544 | 12/1974 | Kolcher | 280/651 X |
| 4,049,284 | 9/1977 | Capper | 280/47.18 |

*Primary Examiner*—Joseph F. Peters, Jr.
*Assistant Examiner*—Norman L. Stack, Jr.
*Attorney, Agent, or Firm*—Edward D. O'Brian

[57] ABSTRACT

Two-wheeled carts can be constructed so that their bodies can be manipulated between a normal, expanded configuration in which such carts can be used and a folded, relatively compact configuration in which such carts may be easily and conveniently stored. Such foldable carts include side walls, at least one of which is constructed so as to include two panels and a hinge connecting such panels in edge-to-edge relationship. A connector pivotally connects the side walls so that they can be manipulated so as to be moved generally toward one another as the structure is manipulated from the unfolded to the folded configuration. The extremities of these side walls are connected by end walls each of which consist of two wall sections connected in edge-to-edge relationship by center edge hinges. The wall sections have side edges which are connected to the sides by side edge hinges.

22 Claims, 11 Drawing Figures

U.S. Patent  Feb. 6, 1979  Sheet 1 of 2  4,138,140
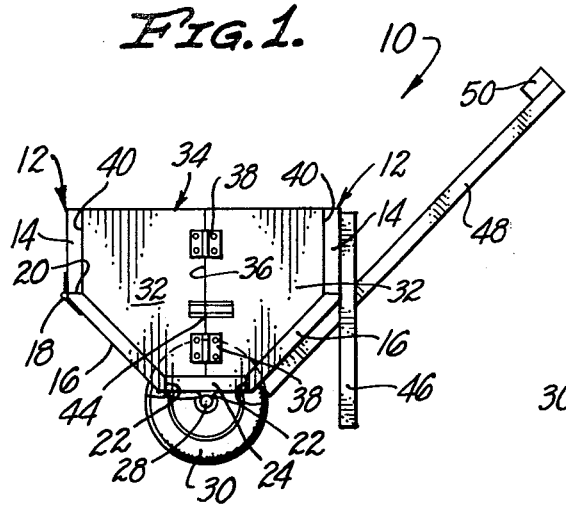
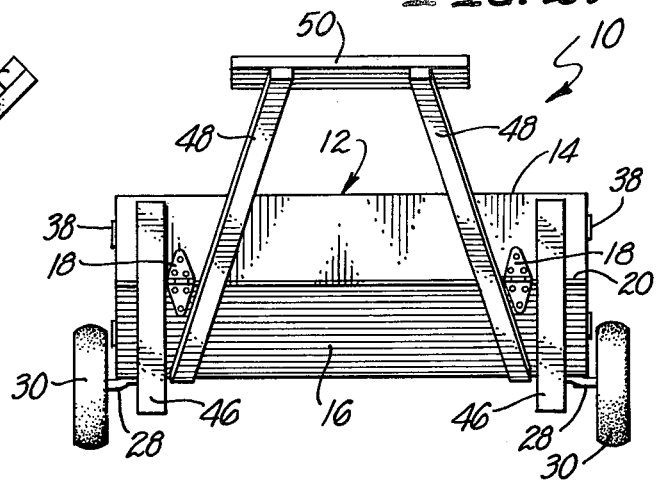
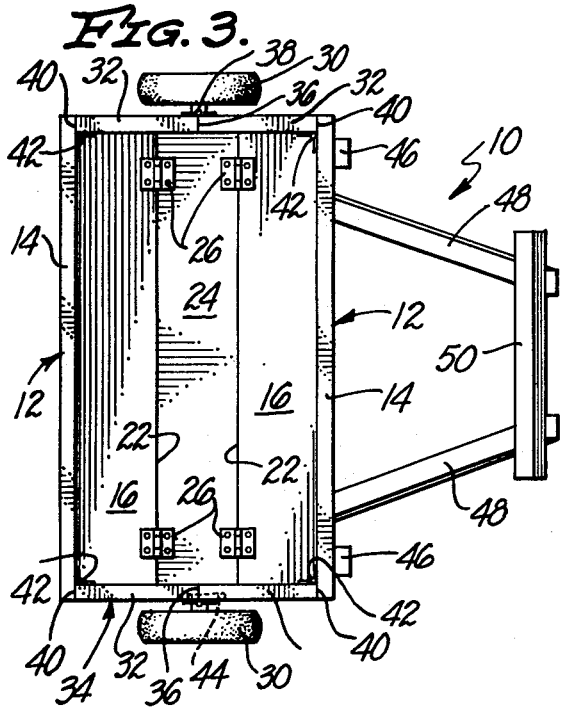
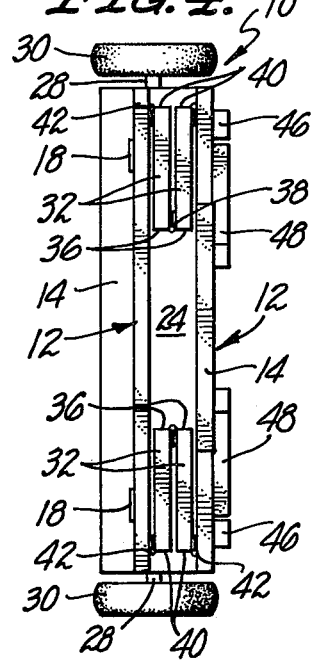
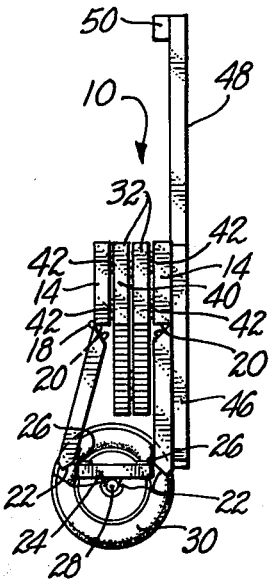
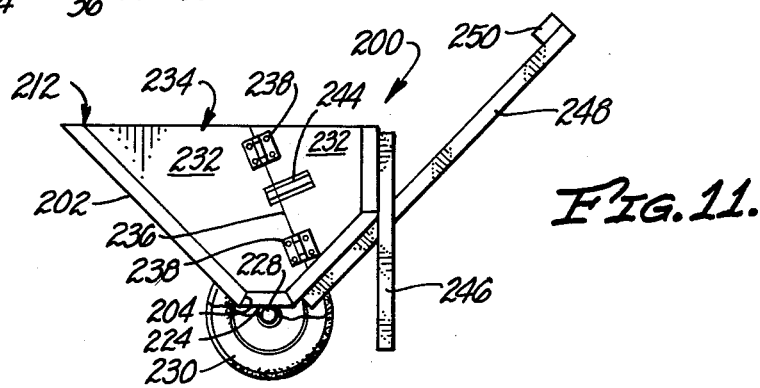

U.S. Patent Feb. 6, 1979 Sheet 2 of 2 4,138,140
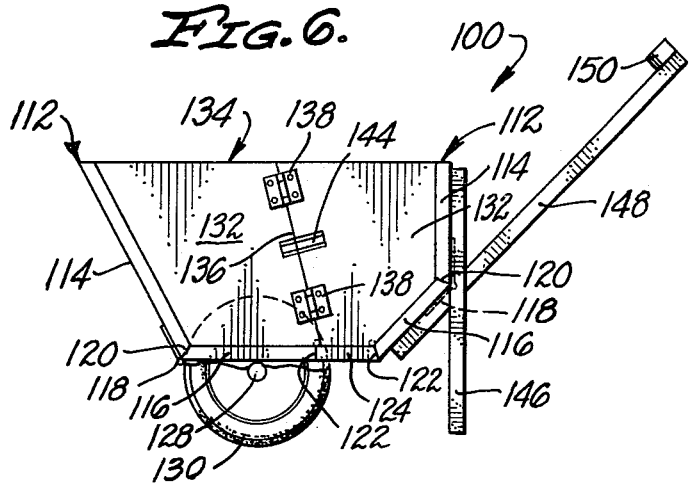
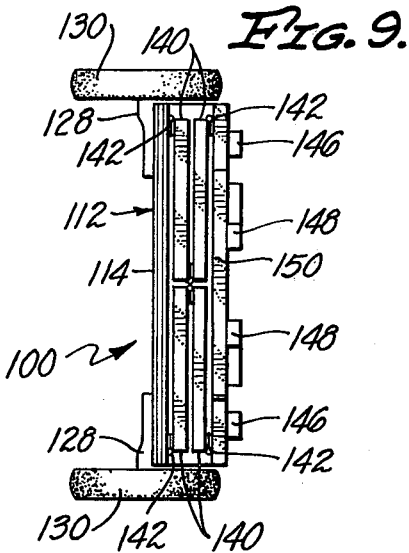
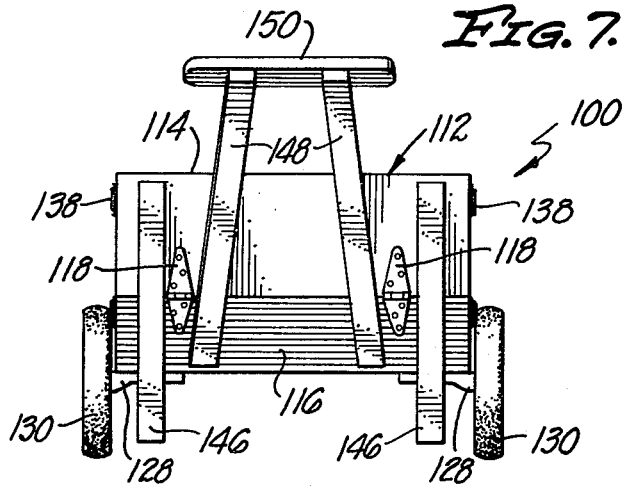
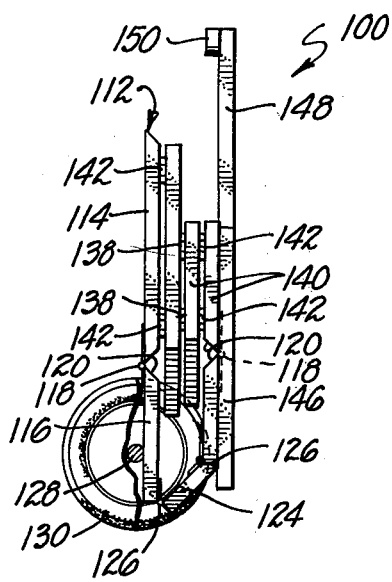
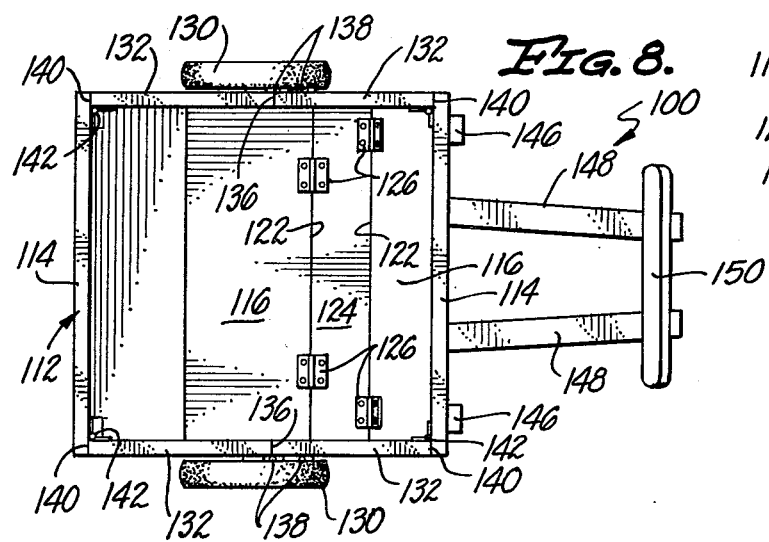

FOLDING STRUCTURES USEFUL AS TWO-WHEELED CARTS

CROSS-REFERENCE TO RELATED APPLICATIONS

The folding structures of the present invention are to degree related to structures as are set forth in the co-pending application Ser. No. 752,104 filed Dec. 20, 1976, entitled "FOLDABLE STRUCTURES CONSIDERED TO BE PRIMARILY USEFUL AS DOGHOUSES," by the inventors named herein as are set forth in the co-pending application Ser. No. 786,884 filed Apr. 12, 1977 entitled "FOLDING STRUCTURES CONSIDERED TO BE PRIMARILY USEFUL FOR PLAY PURPOSES," by the inventors named herein and as set forth in the co-pending application Ser. No. 786,883 filed Apr. 12, 1977 entitled "FOLDING WHEELBARROW," by the inventors named herein. In the interest of brevity the entire disclosure of each and every one of these co-pending applications is incorporated herein by reference.

BACKGROUND OF THE INVENTION

The invention set forth in this specificaton pertains to new and improved folding structures which are presently considered to be of primary utility when used as two wheeled carts or cart-type structures. It is considered that folding structures within the scope of this invention can be employed for a wide variety of different, diverse applications in which it is useful to have a folding structure which can be manipulated between an expanded use configuration and a collapsed folded configuration.

In the past a number of different types of two-wheeled carts or cart-type structures capable of being manipulated between such two configurations have been developed. An understanding of the present invention is not considered to require a detailed consideration of all such prior structures. Certain of such prior structures have been primarily constructed so as to be specifically adapted for limited purpose type uses. Other of such prior structures are considered to be of such a character as to require unnecessary manipulation as they are folded between an expanded or use configuration and a collapsed, folded configuration. Further, certain of such prior structures are considered to be unnecessarily complex and/or to be of such a character as to be incapable of being adapted for specialized uses such as, for example, in spreading fertilizer.

SUMMARY OF THE INVENTION

As a result of these considerations it is considered that there is a need for new and improved folding structures which are useful as two-wheeled carts or cart-type structures. A broad objective of the present invention is to fulfill this need. Other objectives of this invention are to provide new and improved folding structures which can be utilized for a wide variety of diverse purposes and which are of such a character that they may be modified through routine engineering skill as may be reasonably required so as to be specifically adapted for such diverse applications.

Other objectives of the present invention are to provide folding structures as indicated in the preceding which are relatively simple in character, which may be constructed at a comparatively nominal cost with minimal difficulty, which may be easily and conveniently manipulated between an unfolded or expanded configuration and a folded or collapsed configuration, and which are capable of being satisfactorily utilized with a minimum of difficulty for their intended purpose such as, for example, in transporting a load from one location to another. Another broad objective of the invention is to provide structures as described which are essentially self-locking in character in the sense that if desired they can be employed without conventional fastener means serving to secure the parts of these structures in an expanded or unfolded configuration. If desired, fasteners can be employed with these structures to guard against inadvertent or accidental folding.

In accordance with this invention these objectives are achieved by providing a folding structure which in an unfolded configuration has side walls spaced from one another, end walls connecting spaced extremities of the side walls and connecting means connecting adjacent edges of the side walls in which the improvement comprises: the connecting means pivotally connecting adjacent edges of the side walls so that the side walls may be moved generally toward one another in manipulating the folding structure from the unfolded configuration into a folding configuration, at least one of the side walls including two panels and side hinge means, the side hinge means pivotally joining the panels in edge-to-edge relationship so that panels have adjacent edges extending parallel to the connecting means, each of the end walls consisting of two wall sections and a center hinge means, the wall sections of each of the ends having adjacent edges and side edges, the center edge hinge means connecting the center edges of the wall panels in each of the ends and a side edge hinge means securing each of the side edge hinge means being connected to the panel of each side wall consisting of two panels which is furthest remote from the connecting means.

BRIEF DESCRIPTION OF THE DRAWINGS

Because of the nature of this invention it is best more fully explained with reference to the accompanying drawings in which:

FIG. 1 is a side elevational view of a preferred embodiment of a folding structure of this invention in an unfolded or expanded configuration;

FIG. 2 is a rear elevational view of the structure shown in FIG. 1;

FIG. 3 is a top plan view of the structure shown in FIG. 1;

FIG. 4 is a top plan view of the structure shown in FIG. 1 in a folded or collapsed configuration;

FIG. 5 is a side elevational view of the structure shown in FIG. 1 in a folded or collapsed configuration;

FIG. 6 is a side elevational view of another presently preferred embodiment of a folding structure of this invention in an unfolded or expanded configuration;

FIG. 7 is a rear elevational view of the structure shown in FIG. 6;

FIG. 8 is a top plan view of the structure shown in FIG. 6;

FIG. 9 is a top plan view of the structure shown in FIG. 6 in a folded or collapsed configuration;

FIG. 10 is a side elevational view of the structure shown in FIG. 6 in a folded or collapsed configuration; and FIG. 11 is a side elevational view of a third presently preferred embodiment of a folding structure of the invention.

The two-wheeled cart illustrated in the accompanying drawings embody the concepts or principles set forth and defined in the appended claims. It is considered obvious that these concepts or principles can be embodied in somewhat differently appearing folding structures which are either employed in two-wheeled carts or for other purposes through the normal routine exercise of ordinary mechanical skill. For this reason the invention set forth herein is not to be considered as being limited by the accompanying drawings.

DETAILED DESCRIPTION

In the FIGS. 1 to 5 of the drawings there is shown a folding structure 10 in accordance with this invention which is formed as a two-wheeled cart capable of being utilized by children for play or related purposes but which is also capable of being utilized in a wide variety of other diverse manners. This structure 10 includes side walls 12 each of which includes a top elongated panel 14 and a bottom elongated panel 16. These side walls 12 also include side edge hinges 18 which pivotally join the panels 14 and 16 so that edges 20 of these panels 14 and 16 abut one another when the structure 10 is in an unfolded configuration.

It will be noted that the panels 14 and 16 and the axes of the hinges 18 on each of the side walls 12 are all parallel to one another. They are also parallel to lower edges 22 on the panels 16 which abut against a comparatively long, narrow connecting wall 24 when the structure 10 is in an unfolded configuration. This connecting wall 24 is connected by a set of parallel connecting hinges 26 to each of the bottom panels 16 in such a manner that the side walls 12 may be folded toward one another during manipulation of the structure 10 from an unfolded configuration to a folded configuration.

Although it would be possible to omit the connecting wall 24 in a structure such as the structure 10 and to substitute for it a single set of connecting hinges 26 securing the bottom panel 16 together it is preferred to utilize the connecting wall 24 for several reasons. This wall 24 serves to provide what may be referred to as a flat surface (not separately numbered) which avoids the disadvantages of essentially a V-shaped bottom within the structure 10. It may be easily provided with various openings (not separately shown) which may be utilized for such purposes as dispensing fertilizer or the like. It also provides a convenient location approximately midway between the side walls 12 for use in mounting an axle 28 used to support wheels 30 forming a part of the complete structure 10.

Further, this wall 24 is preferably of such width as to space the side walls 12 when the structure 10 is in the folded configuration so that the panels 14 and 16 extend parallel to one another a sufficient distance so that end wall sections 32 are folded between these side walls 12. In the structure 10 two end walls 34 each consisting of two of the wall sections 32 are utilized to connect the side walls 12. These sections 32 have center edges 36 connected by center edge hinges 38 and side edges 40 which are connected to the top panels 14 by means of side edge hinges 42.

It will be noted that the center hinges 38 are located generally toward the exterior (not separately numbered) of the structure 10 while the side edge hinges 42 are located generally on the side (not separately numbered) of the structure 10. This enables the end wall sections 32 to be inwardly folded during the manipulation of the structure 10 from the unfolded configuration to the folded configuration. As a result of the fact that the sections 32 fold in this manner the structure 10 folds to a relatively compact configuration.

In the preferred manner of constructing the structure 10 the hinges 38 and 42 are preferably located so as to have parallel axes (not shown) although if desired the parts can be arranged so as to have these axes located generally along each of the end wall sections 32 meeting in a common point. As a result of the use of the end wall sections 32 connected to the top panels 14 as described the top panels 14 will pivot relative to the connecting wall 24 and remain parallel to one another as the structure 10 is manipulated between folded and unfolded configurations. This pivoting action causes an elevation of the end walls 34 relative to the connecting wall 24 as the structure 10 is moved from the unfolded to the folded configuration.

As a result of this it is possible to construct the structure 10 in such a manner that as it is manipulated to an unfolded configuration the end wall sections 32 will be moved so as to fit reasonably tightly against the bottom panels 16 and the connecting wall 24. Preferably the structure 10 is dimensioned so that the panels 14 and 16 and the connecting wall 24 abut against one another as shown in an unfolded configuration in such a manner as to preclude further unfolding of the structure 10 past this unfolded configuration. In other words the structure 10 is preferably dimensioned so that it can only be manipulated with the side walls 12 moving between the folded and unfolded configuraion shown.

When the structure 10 is constructed in this manner the "fit" between the parts indicated make it impossible for the end wall sections 32 to automatically move during folding into or out of an unfolded position in which these sections 32 are aligned with one another because of the face that the hinges 38 and 42 are located on opposite surfaces (not separately numbered) of the end walls 34. The positions of these hinges 38 and 42 make it possible to apply a force against the end wall sections 32 in order to "snap" the end wall sections 32 into or out of alignment as shown in FIGS. 1 and 3.

In effect, the action involved here is an overcenter toggle type action in which the inherent resiliency of the materials used in forming parts as described serves to bias the end wall sections 32 in an aligned, unfolded position as shown. It will be realized that the materials used in forming the panels 14 and 16 and the wall sections 32 are normally considered rigid even though they possess an amount of resiliency enabling the structure 10 to employ a toggle action as described serving to lock the end walls 32 in an unfolded configuration or position.

Although the toggle action mentioned in the preceding will normally be adequate to hold the structure 10 against inadvertent folding or unfolding it is possible to employ one or more conventional fasteners 44 such as barrel bolts to guard against this eventuality. The use of a fastener 44 is particularly desirable in case the structure 10 is to be used for play purposes by children. Although a fastener 44 may be utilized wherever two parts (not separately numbered) of the structure 10 which are adapted to fold with respect to one another come together it is considered desirable to utilize the fasteners 44 in locations where there is apt to be minimal leverage exerted upon such fasteners 44.

As a result of this it is considered that fasteners 44 should be utilized on the end wall sections 32 so as to secure these sections with the center edges 36 together so that they are aligned with one another. It is considered that the fasteners 44 should be located so as to be exposed to the exteriors (not separately numbered) of the structure 10 when the structure 10 is in an unfolded configuration. In order to prevent the fasteners 44 used in such locations from interfering with the folding action it is preferred to recess them into the sections 32 as indicated.

The structure 10 may also include legs 46 attached to the top panel 14 of one of the side walls 12. These legs 46 will of course fold with the top panel 14 so as to lie flush against the associated bottom panel 16 when the structure 10 is in a folded configuration. This associated bottom panel 36 may also be secured to one or more arms 48 carrying a handle 50. Because of the sloping position of this bottom panel 16 when the structure 10 is unfolded the arms 48 will automatically extend from the structure 10 in a position for use in moving the structure 10 about on the wheels 30. These arms 48 will also fold comparatively flat with a side wall 12 when the structure 10 is in the folded configuration.

When the structure 10 is in this folded configuration the arms 48 and the handle 50 will project to a degree from the remainder of the structure 10. Normally this is not considered to be objectionable since it enables the handle 50 to be utilized in hanging the folded structure 10 on a hook or the like in an out of the way location. However, if this is objectionable a conventional folded or detachable handle may be secured to the remainder of this structure 10.

In FIGS. 6 through 10 of the drawings there is shown a modified structure 100 which in most respects is essentially the same as the structure 10. For convenience and in the interest of brevity those parts of the structure 100 which directly correspond to the previously described structure 10 are not separately described herein and are designated in the remainder of this specification and in the drawings by the numerals previously utilized to designate such parts preceded by the numeral 1.

The structure 100 differs from the structure 10 primarily as to the geometry employed. In the structure 100 one of the side walls 112 which is remote from the handle 150 is constructed so that its bottom panel 116 in an unfolded configuration is coplanar with the connecting wall 124. This provides a comparatively large bottom (not separately numbered) within the cart tending to make the cart more desirable for certain types of uses than the cart or structure 10. In order to accommodate the panel 116 extending in the manner noted it is necessary to modify the end walls 134 slightly so that the center edges 136 of the sections 132 extend as shown.

With this structure 100 the axes of the center edge hinges 138 and the side edge hinges 142 at each of the end walls 134 meet in a common point beneath the structure 100. This is necessary for the structure 100 to fold properly. With the structure 100 the axle 128 is mounted on the noted coplanar panel 116 in order to provide proper "balance" so that the structure 100 will remain in an upright position on the wheels 130 and the legs 146.

In FIG. 11 of the drawing there is shown a further modified structure 200 which in most respects is essentially the same as the structure 10. For convenience and in the interest of brevity those parts of the structure 200 which directly correspond to the previously described structure 10 are not separately described herein and are designated in the remainder of this specification and in the drawings by the numerals previously utilized to designate such parts preceded by the numeral 2.

The structure 200 differs from the structure 10 in that one of the side walls 12 previously described is replaced by another side wall 202 which consists of a single, unitary panel having a lower edge 204 shaped so as to abut the connecting wall 224 when the structure 200 is in an unfolded configuration. This particular side 202 extends at an obtuse angle relative to the connecting wall 224 in this unfolded configuration. It is connected to the connecting wall 224 by connecting hinges 226.

In order to achieve a folding action with this particular geometry it is necessary to have the axes of the side edge hinges 242 employed in connection with a side wall 202 and the top panel 214 of the other side wall 212 meet in a common point. Further it is necessary that the axes of the center edge hinges 38 also meet at such a point. It is to be noted that there are two of these common points each corresponding to the plane of an end wall 234.

The structure 200 illustrates the principle that it is necessary to utilize only one side wall which is composed of two panels or sections corresponding to the panels 14 and 16 in obtaining a folding action within a completely assembled folding structure as described. During folding of a structure corresponding to the structure 200 the one top panel 214 employed pivots relative to the connecting wall 224 to a sufficient extent so that the end walls 234 will move from fitting against the side walls 202 and 212 upwardly generally away from the connecting wall 224. With the structure 200 the same type of toggle action described in the preceding will be obtained which will tend to hold the complete structure 200 in an unfolded configuration after it has been manipulated to such a configuration.

We claim:

1. A folding structure which in an unfolded configuration has side walls spaced from one another, end walls connecting spaced extremities of said side walls and connecting means connecting adjacent edges of said side walls in which the improvement comprises:
   said connecting means pivotally connecting said adjacent edges of said side walls so that said side walls may be moved generally toward one another in manipulating said folding structure from said unfolded configuration into said folded configuration,
   at least one of said side walls including two panels and side hinge means, said side hinge means pivotally joining said panels in edge-to-edge relationship so that said panels have adjacent edges extending parallel to said connecting means,
   each of said end walls consisting of two wall sections and a center hinge means, said wall sections in each of said end walls having adjacent center edges and side edges, said center edge hinge means pivotally connecting said center edges of said wall sections in each of said end walls, and
   a side edge hinge means securing each of said side edges of said wall sections to said side walls, said side edge hinge means being connected to the side panel of each side wall consisting of two panels which is farthest remote from said connecting means,
   said panels of each of said side walls being pivotally connected so as to be capable of pivoting relative to one another so as to be beside one another and between said side walls when said structure is in said unfolded configuration, said panels of each of said end walls being aligned with one another when said structure is in said unfolded configuration.

2. A folding structure as claimed in claim 1 in which: said center edge and said side hinge means are located so as to permit said end wall sections to fold inwardly between said side walls when said structure is in said folded configuration.

3. A folding structure as claimed in claim 1 in which: said side walls and said connecting means fit relative to one another when in said unfolded configuration so as to limit movement of said side walls away from one another as said folding structure is manipulated from said folded to said unfolded configuration.

4. A folding structure as claimed in claim 2 in which: said center edge and said side hinge means are located so as to permit said end wall sections to fold inwardly between said side walls when said structure is in said folded configuration,
said center edge and said side edge hinge means are located relative to said end wall sections and said end wall sections fit relative to said side walls so as to constitute an overcenter toggle serving to hold said end walls in place in said unfolded configuration.

5. A folding structure as claimed in claim 1 in which: the axes of said center edge hinge means and said side edge hinge means at both of said ends are located parallel to one another.

6. A folding structure as claimed in claim 1 in which: the axes of said center edge hinge means and said side edge hinge means at each of said ends are located so as to meet at a common point.

7. A folding structure as claimed in claim 1 in which: both of said side walls include two panels and side hinge means.

8. A folding structure as claimed in claim 1 in which: one of said side walls consists of a single panel and the other of said side walls includes two panels and side hinge means.

9. A folding structure as claimed in claim 1 in which: said connecting means comprises a connecting wall extending generally between said side walls and connecting hinge means securing each of said side walls to said connecting means.

10. A folding structure as claimed in claim 1 in which: said connecting means comprises a connecting wall extending generally between said side walls and connecting hinge means securing each of said side walls to said connecting means,
said center edge and said side hinge means are located so as to permit said end wall sections to fold inwardly between said side walls when said structure is in said folded configuration,
said side walls and said connecting means fit relative to one another when in said unfolded configuration so as to limit movement of said side walls away from one another as said folding structure is manipulated from said folded to said unfolded configuration,
said center edge and said side edge hinge means are located relative to said end wall sections and said end wall sections fit relative to said side walls so as to constitute an overcenter toggle serving to hold said end walls in place in said unfolded configuration.

11. A folding structure as claimed in claim 1 useful as a cart including:
axle means mounted on said connecting means and wheel means mounted on said axle means adjacent to each of said side walls.

12. A folding structure as claimed in claim 11 in which:
said connecting means comprises a connecting wall extending generally between said side walls and connecting hinge means securing each of said side walls to said connecting means,
said axle means is mounted on said connecting wall.

13. A folding structure as claimed in claim 11 including:
handle means for use in moving said folding structure connected to the side panel of a side wall consisting of two side panels which is adjacent to said connecting means so as to fold therewith and so as to extend therefrom.

14. A folding structure as claimed in claim 11 including:
leg means attached to the side panel of a side wall consisting of two side panels which is remote from said connecting means so as to fold therewith and so as to extend therefrom.

15. A folding structure as claimed in claim 11 in which:
said center edge and said side hinge means are located so as to permit said end wall sections to fold inwardly between said side walls when said structure is in said folded configuration,
said center edge and said side edge hinge means are located relative to said end wall sections and said end wall sections fit relative to said side walls so as to constitute an overcenter toggle serving to hold said end walls in place in said unfolded configuration.

16. A folding structure as claimed in claim 11 including:
handle means for use in moving said folding structure connected to the side panel of a side wall consisting of two side panels which is adjacent to said connecting means so as to fold therewith and so as to extend therefrom,
leg means attached to the side panel of a side wall consisting of two side panels which is remote from said connecting means so as to fold therewith and so as to extend therefrom, and in which:
said connecting means comprises a connecting wall extending generally between said side walls and connecting hinge means securing each of said side walls to said connecting means,
said axle means is mounted on said connecting wall.

17. A folding structure as claimed in claim 16 in which:
said center edge and said side hinge means are located so as to permit said end wall sections to fold inwardly between said side walls when said structure is in said folded configuration,
said center edge and said side edge hinge means are located relative to said end wall sections and said end wall sections fit relative to said side walls so as to constitute an overcenter toggle serving to hold said end walls in place in said unfolded configuration.

18. A folding structure which in an unfolded configuration has spaced front and back walls, two end walls which are spaced from one another, which extend between said front and back walls, and which are attached to said front and back walls, and a bottom wall connecting the bottom edges of said front and back walls in which the improvement comprises:

said bottom wall having a front edge which is pivotally connected to the bottom edge of said front wall, said bottom wall having a rear edge which is pivotally connected to the bottom edge of said back wall, said front and back walls being pivotally connected to said bottom wall so as to be capable of being pivoted relative to said bottom wall about parallel axes, said back wall including an upper and a lower panel, which panels are pivotally connected to one another in an edge-to-edge relationship so as to be capable of pivoting relative to one another about an axis which is parallel to said axes, each of said end walls consisting of front and rear wall sections which are pivotally connected to one another between said front and back walls so as to be capable of being pivoted from a position in which said sections are aligned with one another when said structure is unfolded to a position in which said sections are located so as to extend beside one another when said structure is folded, said rear section being pivotally connected to the upper of said panels, said front section being pivotally connected to said front wall, said sections being connected to said front and rear walls and to one another so as to be capable of being pivoted so as to extend beside one another between said front and rear walls when said front and rear walls are pivoted toward one another into said folded configuration.

19. A folding structure as claimed in claim 18 wherein:

said front wall includes upper and lower panels, which panels are pivotally connected to one another in an edge-to-edge relationship so as to be capable of pivoting relative to one another about an axis which is parallel to said axes.

20. A folding structure as claimed in claim 19 including:

two wheels, each of which is rotatably mounted on said bottom wall, said wheels being located on opposite sides of said structure.

21. A folding structure as claimed in claim 20 including:

handle means attached to said lower panel of said back wall so as to pivot therewith.

22. A folding structure as claimed in claim 18 including:

two wheels, each of which is rotatably mounted on said bottom wall, said wheels being located on opposite sides of said structure.

* * * * *